(12) United States Patent
Kim

(10) Patent No.: US 7,603,149 B2
(45) Date of Patent: Oct. 13, 2009

(54) SWIVEL-TYPE MOBILE TERMINAL AND CONTROL METHOD THEREOF

(75) Inventor: Bong-Yeon Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 11/016,766

(22) Filed: Dec. 21, 2004

(65) Prior Publication Data

US 2005/0136970 A1   Jun. 23, 2005

(30) Foreign Application Priority Data

Dec. 22, 2003   (KR) ...................... 10-2003-0094961

(51) Int. Cl.
*H04M 1/00* (2006.01)

(52) U.S. Cl. .................. 455/575.3; 455/566; 455/575.1

(58) Field of Classification Search .............. 455/550.1, 455/566, 575.1, 575.2, 575.3, 90.1, 347, 455/350, 351
See application file for complete search history.

(56) References Cited

U.S. PATENT DOCUMENTS

| 5,493,690 | A | * | 2/1996 | Shimazaki | ............... | 455/575.3 |
| 2004/0219957 | A1 | * | 11/2004 | Nishijima et al. | ........ | 455/575.3 |
| 2005/0239521 | A1 | * | 10/2005 | Harada et al. | ............ | 455/575.3 |

FOREIGN PATENT DOCUMENTS

| CN | 1411253 | 4/2003 |
| CN | 1413047 | 4/2003 |
| EP | 0 977 414 A2 | 2/2000 |
| EP | 1 473 910 A2 | 11/2004 |
| GB | 2 381 989 | 5/2003 |
| JP | 2003-125047 | 4/2003 |
| JP | 2003-244293 | 8/2003 |
| JP | 2004-336091 | 11/2004 |
| WO | WO 93/07680 | 4/1993 |
| WO | WO 01/84729 A1 | 11/2001 |
| WO | WO 03/078854 A1 | 9/2003 |

OTHER PUBLICATIONS

A5305K Manual, Japan, au (KDDI), May 16, 2003, pp. 24-25.
Japanese Office Action dated Jul. 20, 2007, and its English translation.
A5305K Owner's manual, Japan, au(KDDI), May 16, 2003, pp. 1-7 in English.
European Search Report dated Aug. 13, 2007.
Chinese Office Action dated Mar. 7, 2008.
Japanese Office Action dated Feb. 13, 2007, with English translation.
A5305K Manual, Japan, au (KDDI), May 16, 2003, pp. 24-25.

* cited by examiner

*Primary Examiner*—Thanh C Le
(74) *Attorney, Agent, or Firm*—Ked & Associates LLP

(57) ABSTRACT

A swivel-type mobile terminal includes a terminal body having a microphone, a display unit which is rotatably and swingably connected to the terminal body and mounted with a display window, a first receiver in the display unit for outputting audio signals when the display unit is rotated to be an open position, and a second receiver in the display unit for outputting audio signal when the display unit is folded in a position which allows the display window to be viewable by a user. In this folded position, the terminal can support phone calls while adjusting the gain of the microphone. The display is also viewable by a user while in this position.

18 Claims, 5 Drawing Sheets

SWIVEL-TYPE MOBILE TERMINAL AND CONTROL METHOD THEREOF

BACKGROUND OF THE INVENTION

1. Field of the Invention

The present invention generally relates to electronic devices having displays.

2. Description of the Related Art

There are many types of mobile terminals. A flip-type mobile terminal is one having a cover relative to a main body. A folder-type mobile terminal is one in which a folder part including an LCD is folded into opened and closed positions relative to a main body. A slide-type mobile terminal is one in which a display unit including an LCD is slidably opened and closed. Recently, a swivel-type mobile terminal has been introduced. This type of terminal has a display unit which rotates relative to a main body.

FIG. 1 is a perspective view of a related-art swivel-type mobile terminal. This terminal includes a terminal body 110, a display unit 120, and a swing hinge portion 130. The terminal body is provided with a PCB having various circuit components mounted therein, and a key pad 102 at its front surface. The display unit is rotatably and swingably connected to an upper end of the terminal body and includes a display window 122 for displaying information. The swing hinge portion is installed between the terminal body and display unit and supports the display unit in a way that allows it to rotate and swing relate to the terminal body. A microphone 104 for transmitting audio signals is mounted at a lower side of the terminal body and a receiver 124 for receiving audio signals is installed at an upper side of the display unit.

A swivel-type mobile terminal has a number of advantages. For example, the display unit 120 may be unfolded and then rotated to a desired position to allow convenient viewing of the display window 122 from a variety of angles. Also, the display unit may be further rotated and then folded over the terminal body, allowing the display window 122 to be exposed to the viewer when in a folded position. This allows a user to check an image displayed on the display window, and in the case of taking a picture using a camera makes it easy to check an image through the display window.

However, the related-art swivel-type mobile terminal has a number of disadvantages. For example, when the display window is rotated outwardly and then swung into a folded position over the terminal body, a phone call cannot be made. That is, a phone call can only be made after the display unit is rotated to a position relative to the display window that faces an inside position in alignment with the keypad.

SUMMARY OF THE INVENTION

An object of the invention is to solve at least one of the above problems and/or disadvantages and to provide one or more of the advantages described hereinafter.

Another object of the present invention is to provide a swivel-type mobile terminal which allows a phone call to be made when the display is in a rotated position.

Another object of the present invention is to provide a swivel-type mobile terminal which allows a phone call to be made even when the display unit is rotated and folded to a position where the display window is facing outwardly.

To achieve these and other objects and advantages, the present invention provides a swivel-type mobile terminal including; a terminal body mounted with a microphone to which an audio signal is inputted; a display unit rotatably and swingably connected to the terminal body and mounted with a display window for displaying information; a first receiver mounted at the display unit and outputting an audio signal when the display unit is rotated to be opened; and a second receiver mounted at the display unit and outputting an audio signal when the display unit is folded to expose the display window to the outside.

The microphone is constructed to variably set an amplification factor of the inputted audio signal. The microphone is also mounted at an end portion of the terminal body to be exposed to the outside when the display unit is folded to expose the display window to the outside or at a side portion of the terminal body to be exposed to the outside when the display unit is folded to expose the display window to the outside.

The swivel-type mobile terminal further includes a control unit for controlling the microphone, the first receiver and the second receiver in order to enable to make a phone call in a state that the display unit positioned to expose the display window to the outside is swiveled.

The control unit includes: a sensing unit for sensing a state that the display unit is folded to expose the display window to the outside; and a controller for controlling an amplification factor of an audio signal inputted to the microphone and selectively connecting one of the first receiver and the second receiver to a video path according to an applied signal from the sensing unit.

A control method of the swivel type mobile terminal in accordance with the present invention comprises: a first step of determining whether the display unit is in a swiveled state; a second step of, if the display unit is determined to be in a swiveled state in the first step, connecting the second receiver to the video path and setting an amplification factor of the microphone high; and a third step of making a phone call in a state that the display unit is swiveled.

The control method further comprises a step of connecting the first receiver to 10 the video path and setting the amplification factor of the microphone low if the display unit is not in a swiveled state in the first step.

In the first step, when the display unit is in a swiveled state to expose the display window to the outside, if a second sensor mounted at the terminal body senses a magnetic field of a magnet mounted at the display unit and applies a signal to the controller, the controller determines the display unit is in a swiveled state.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF THE PREFERRED EMBODIMENTS

Figure 1:
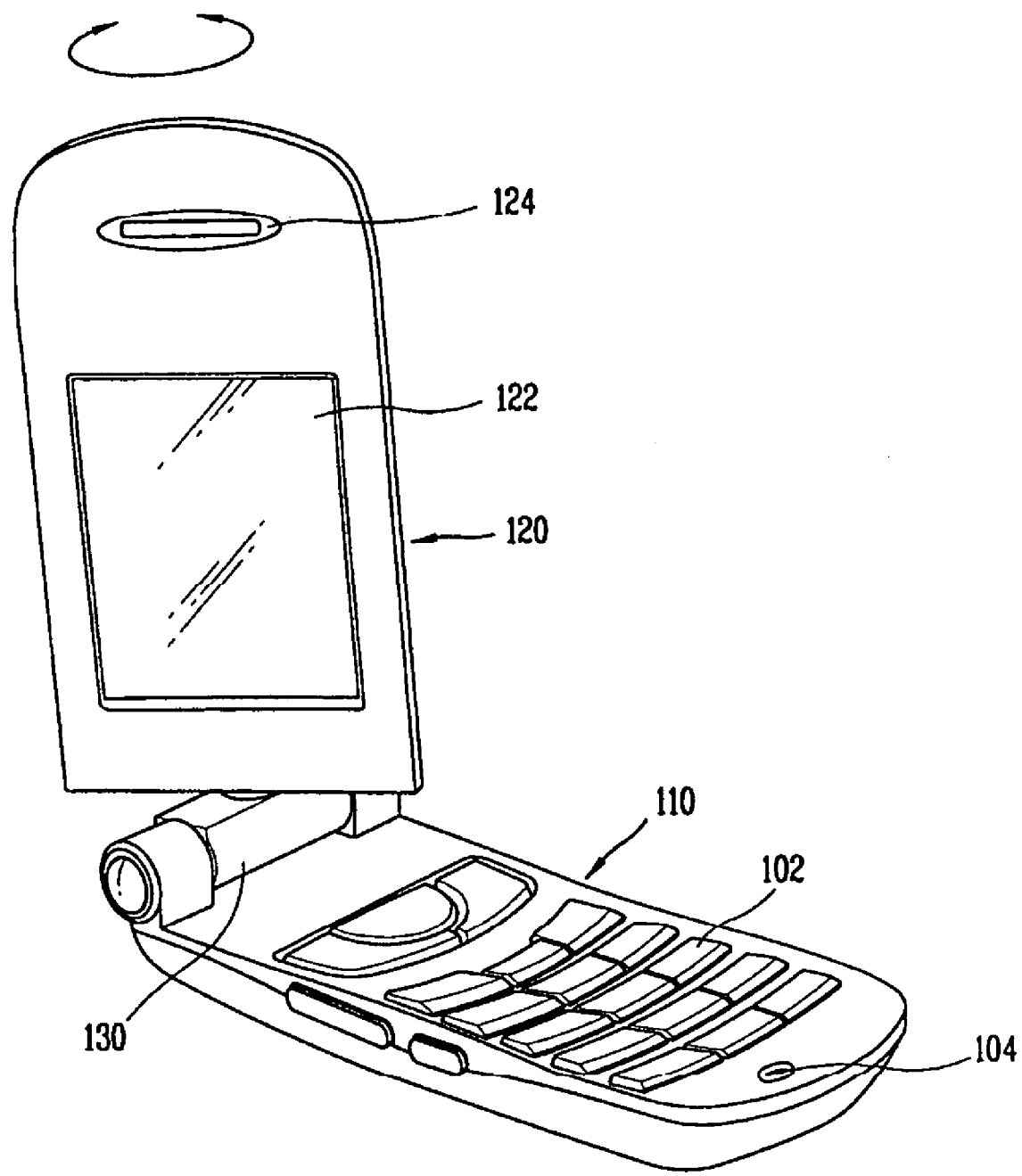
FIG. 1 is a perspective view of a related-art mobile terminal.
Figure 2:
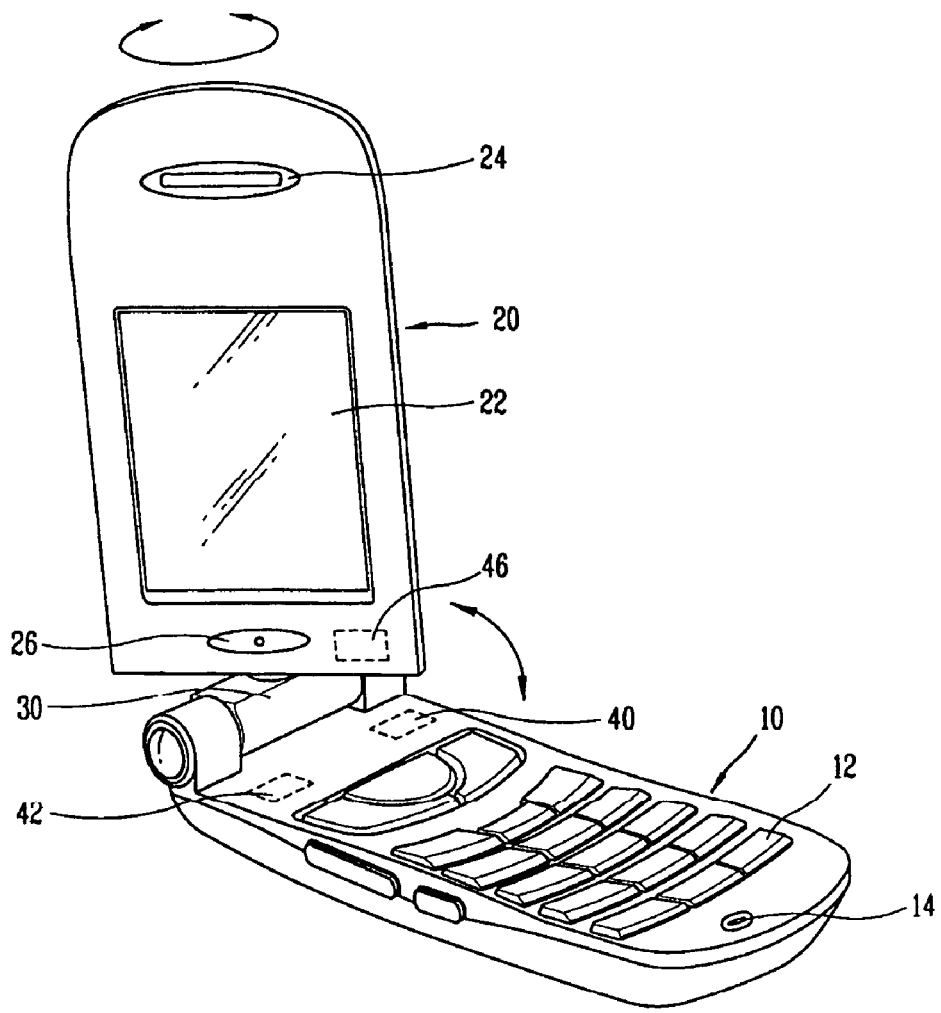
FIG. 2 is a perspective view of a mobile terminal in accordance with one embodiment of the present invention.

FIG. 2 shows a swivel-type mobile terminal in accordance with one embodiment of the present invention.

The terminal includes a terminal body 10, a display unit 20, a swing hinge portion 30, and an internal control unit. The terminal body includes a printed circuit board (PCB) having various circuit components mounted therein, and a key pad 12 which a user manipulates to perform various terminal functions. The display unit is rotatably and foldably connected to the terminal body includes a display window 22 for displaying information. The swing hinge portion is installed between the display unit and terminal body and allows the display unit to rotate and fold into open and closed positions relative to the terminal body. The control unit makes it possible to allow a phone call to be made when the display unit is folded in a closed position over the keypad when window 22 is positioned outwardly relative to the terminal body. See, for example, FIG. 7.

Figure 3:
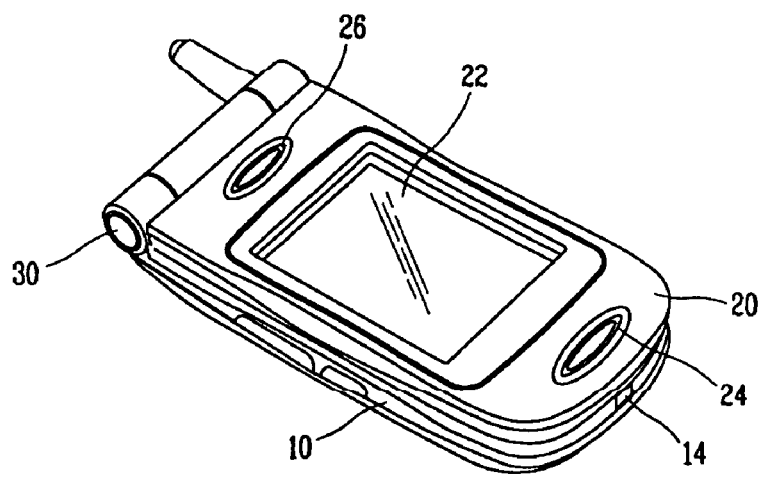
FIG. 3 is a perspective view showing the mobile terminal according to the present invention in a folded position.

The swing hinge portion 30 is preferably mounted at an upper end of the terminal body and a microphone 14 may be mounted at a lower end of the body. The microphone may be mounted along a peripheral or edge portion of the terminal body housing (such as shown in FIG. 3) or may be mounted along a lower portion of body 10 (as shown in FIG. 2). Either way, the microphone is positioned to receive voice signals from a user during a phone call when the display is folded over the keypad with window 22 facing outwardly.

As shown in FIG. 2, when display unit 20 is folded to expose display window 22 outwardly, microphone 14 is mounted at a lower end portion of the terminal body 10 or at a side surface of a lower end portion of the terminal body 10 in order to be exposed to the outside. This may be accomplished by making body 10 longer than display unit 20, so that the microphone is exposed even when unit 20 is rotated 180° and then folded in a closed position with window 22 facing outwardly for viewing by the user.

Figure 6:
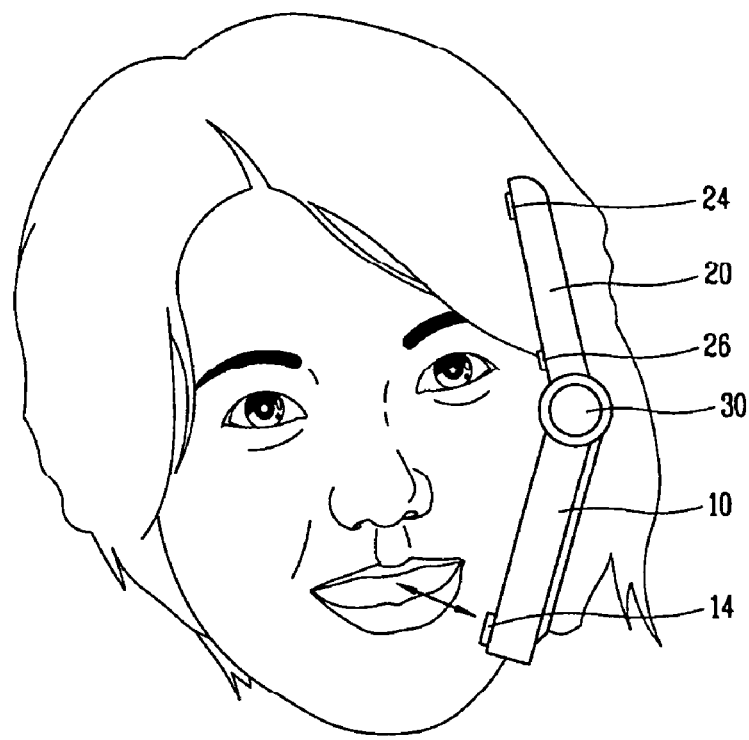
FIGS. 6 and 7 are views showing a calling state of the mobile terminal in accordance with one embodiment of the present invention.
Figure 7:
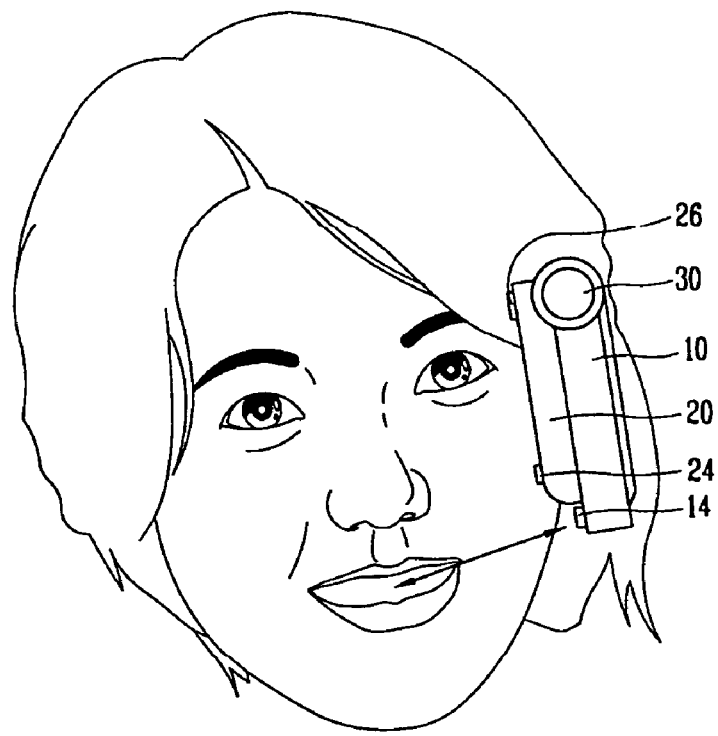

Preferably, the microphone is capable of variably setting an amplification factor of an input audio signal More specifically, based on a signal applied to the control unit, when making a phone call in a state where the display unit is opened normally (e.g., in a position where window 22 is in alignment with the keypad, such as shown in FIG. 6), the amplification factor of the microphone is set low, so that the microphone amplifies the inputted audio signal in a proportional manner. When making a phone call in a state where the display window is rotated and folded to expose display window 22 outwardly (such as shown in FIG. 7), the amplification factor of the microphone is set high, so that the microphone amplifies the input audio signal by a relatively greater amount. This is particularly advantageous when the microphone is mounted at a lower portion of the terminal body such as shown in FIG. 2 and the display unit covers the microphone when folded over the keypad. This may occur, for example, when the display unit and body are substantially the same length.

As shown in FIG. 2, a lower end of the display unit is rotatably and swingably (or foldably) connected to an upper end of the terminal body 10 by swing hinge portion 30. The display window 22 is mounted at an inner side of the display unit 20. In addition, a first receiver 24 for receiving an audio signal in case of making a phone call in a state that the display unit 20 is rotated to be opened by the swing hinge portion 30 is mounted at an upper portion of the display unit 20, and a second receiver 26 for receiving the audio signal in case of making a phone call in a state that the display unit 20 is folded to expose the display window to the outside is mounted at a lower portion of the display unit.

Figure 4:
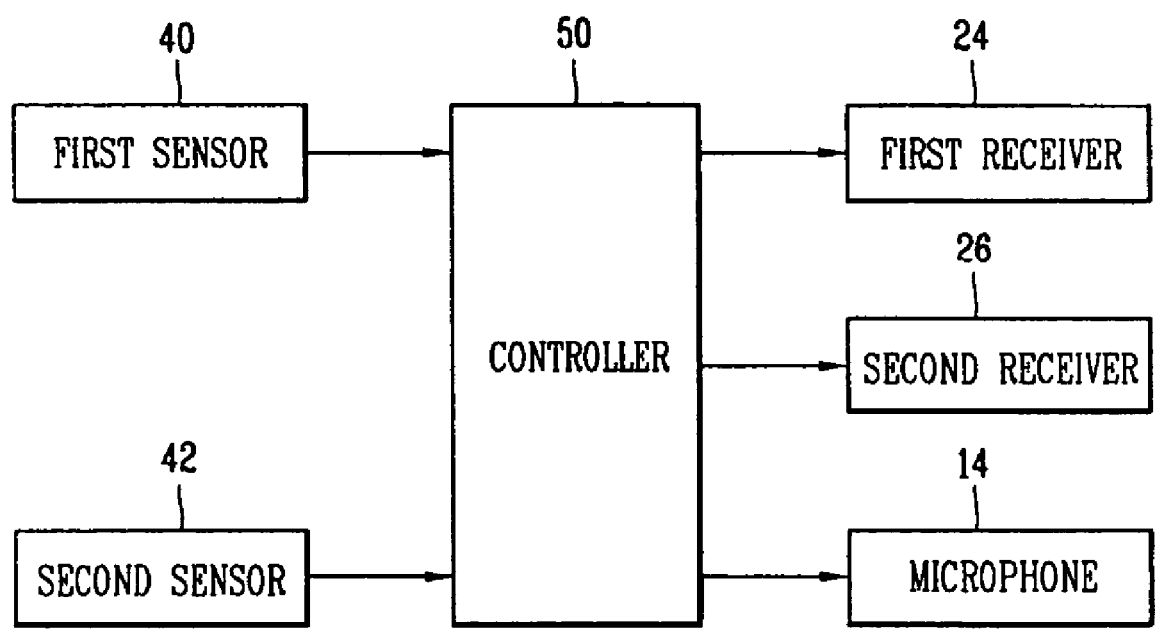
FIG. 4 is a block diagram showing one type of control unit which may be used by the mobile terminal of the present invention.

As shown in FIG. 4, the control unit includes a sensing unit and a controller 50. The sensing unit senses a folding state of the display unit 20 (e.g., whether the display unit is folded in a position where the display window 22 is inwardly located facing opposite the keypad), or in a state where the display unit is folded in a position where display window 22 is located outwardly for viewing by a user. Controller 50 connects one of the first receiver 24 and the second receiver 26 to an audio path according to a signal transferred from the sensing unit, and controls an amplification factor of the microphone to be either low or to be high based on which receiver is connected.

The sensing unit includes a magnet 46, a first sensor 40, and a second sensor 42. The magnet is preferably mounted at one side surface of the display unit for generating a magnetic field. (See FIG. 2). The first sensor is mounted at one side surface of the terminal body for sensing a magnetic field generated from the magnet. The magnet and first sensor are positioned to face one another when the display unit is closed in a normal position with the display window 22 facing inwardly relative to the keypad. In this position, the first sensor applies a signal to the controller.

The second sensor 42 is mounted at the other side surface of the terminal body 10 for sensing a field generated from the magnet. As shown by the dotted lines in FIG. 2, the magnet may be mounted within the terminal body so that it generates a magnetic field detectable by the sensors in respective folded states of the display unit. When the display unit is swung at an angle of 1 80° and then folded to position where the display window faces outwardly, sensor 42 detects the magnetic filed and applies a signal to the controller.

The magnet is preferably mounted at the right of a lower portion of the display unit. In addition, first sensor 40 is mounted at the right of an upper portion of the terminal body, and if the display unit is normally closed the first sensor and magnet are positioned to face to each other. The second sensor 42 is mounted at the left of an upper portion of the terminal body 10, and if the display unit is rotated at angle of 180° and closed (folded), the second sensor and magnet are positioned to face to each other. Those skilled in the art can appreciate that any kind of sensors for sensing a magnetic field generated from the magnet can be used as the first and second sensors.

Figure 5:
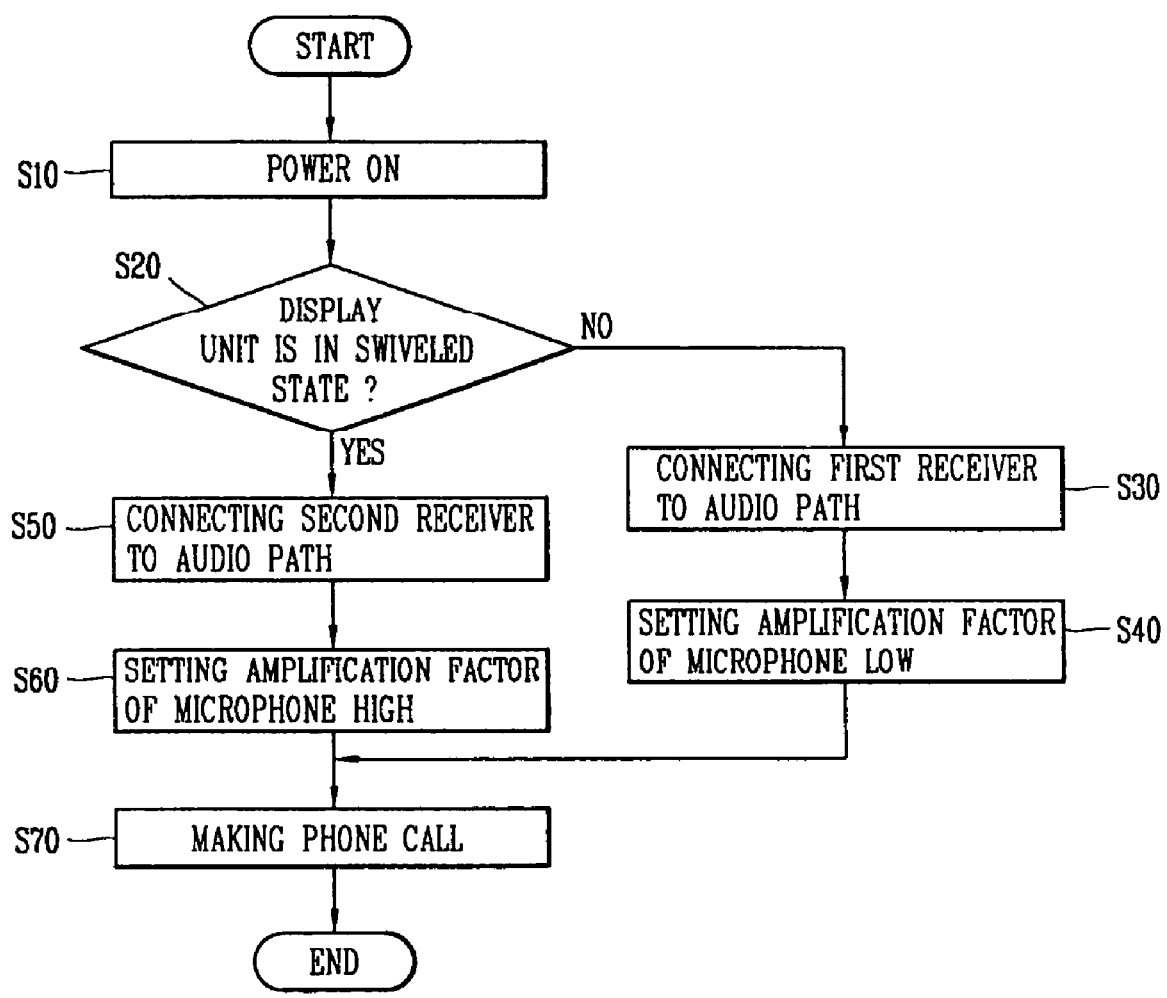
FIG. 5 is a flow chart showing steps included in a process for controlling a mobile terminal in accordance with one embodiment of the present invention.

FIG. 5 is a flow chart showing steps included in a process for controlling the operation of the swivel-type mobile terminal in accordance with one embodiment of the present invention.

First, if the display unit is closed in a normal position (that is, if the display unit is folded on the terminal body in a position where the display window is facing the keypad), the first sensor 40 senses a magnetic field of the magnet and applies a signal to the controller. Controller 50 may then turn off power to the display to save battery.

When the user unfolds the display unit, the power of the terminal body display is turned on. If the power of the terminal body display is turned on, it is next determined whether display unit 20 is in a swiveled state. (S20) The display unit may be determined to be in a swiveled state when unit 120 has been rotated at an angle 180° and then folded over the keypad so that the display window 22 is facing outwardly. In this position, magnet 46 and second sensor 42 are positioned to face each other, and thus the second sensor 42 senses a magnetic field of the magnet 46 and transfers a signal to the controller 50. Then, controller 50 determines that the display unit is in a swiveled state.

In S20, if it is determined that the display unit 20 is not in a swiveled state, as shown in FIG. 6, the controller connects the first receiver to an audio path and sets an amplification factor of the microphone 14 to low. Then, the display unit is normally opened and audio signals are output through the first receiver to a user's ear. Accordingly, a normal phone call is made. (S30, S40 and S70).

In S20, if the display unit is determined to be in a swiveled state, as shown in FIG. 7, the controller connects the second receiver 26 to the audio path and sets an amplification factor of the microphone to high. Then, the second receiver 26 outputs audio signals for hearing by the user. (S50, S60 and S70)

In FIG. 7, since the display unit is folded on the terminal body to expose the display window for viewing, a distance between the second receiver 26 and the microphone is shortened. Therefore, in order to complement said shortened distance, an amplification factor of the audio signal inputted through the microphone 14 is increased, so that a normal phone call can be made.

As so far described, the swivel type mobile terminal according the present invention has an advantage that it is convenient to use because a phone call is made using the first receiver and the microphone when the display unit is unfolded in an unswiveled state, and a phone call made by using the second receiver and the microphone when the display unit is in the swiveled state the display window is exposed for viewing.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
   a terminal body including a microphone;
   a display device, including a display window disposed on a first surface thereof, rotatably coupled to the terminal body so as to be rotatable about an axis that extends substantially parallel to an upper surface of the terminal body and about an axis substantially perpendicular to the upper surface of the terminal body;
   a first receiver disposed on the first surface of the display device to output audio signals when the display device is in an unfolded first position;
   a second receiver disposed on the first surface of the display device to output audio signals when the display device is in a folded second position; and
   a controller that controls the microphone, the first receiver, and the second receiver during a call when die display device is in the second position, wherein the controller comprises:
      a sensor that senses when the display device is in the second position, wherein the controller that controls an amplification factor of an audio signal input into the microphone and selectively connects one of the first receiver and the second receiver to an audio path according to a signal applied from the sensor, and wherein the sensor comprises:
         a magnet that generates a magnetic field;
         a first sensor that senses a magnetic field of the magnet when the display device is in a third position in which the display window is folded over a keypad, and that applies a corresponding signal to the controller; and
         a second sensor that senses a magnetic field of the magnet when the display device is in the second position.

2. The terminal of claim 1, wherein the controller sets the microphone to different amplification factors based on whether the display device is in the first or second position.

3. The terminal of claim 1, wherein the microphone is mounted at an end portion of the terminal body to be exposed when the display device is in the second position.

4. The terminal of claim 1, wherein the microphone is mounted along a side surface of the terminal body to be exposed when the display device is in the second position.

5. The terminal of claim 1, wherein the first and second receivers are mounted on the first surface at different positions.

6. The terminal of claim 1, wherein the second receiver is mounted at a lower portion of the display device.

7. The terminal of claim 1, wherein the magnet is mounted at one edge of the display device, and the first and second sensors are respectively mounted at an opposing edge of the terminal body.

8. A method for controlling a mobile terminal, the mobile phone including a terminal body including a microphone and a display device, including a display window on a first surface thereof, rotatably coupled to the terminal body so as to be rotatable about an axis that extends parallel to an upper surface of the terminal body and about an axis substantially perpendicular to the upper surface of the terminal body, a first receiver disposed on the first surface of the display device to output audio signals when the display device is in an unfolded first position, a second receiver disposed on the first surface of the display device to output audio signals when the display device is in a folded second position, and a controller that controls the microphone, the first receiver, and the second receiver during a call when the display device is in the folded second position, wherein the controller comprises a sensor that senses when the display device is in the folded second position, wherein the controller controls an amplification factor of an audio signal input into the microphone and selectively connects one of the first receiver and the second receiver to an audio path according to a signal applied from the sensor, and wherein the sensor comprises a magnet that generates a magnetic field, a first sensor that senses a magnetic field of the magnet when the display device is in a third position in which the display window is folded over a keypad, and that applies a corresponding signal to the controller, and a second sensor that senses a magnetic field of the magnet when the display device is in the folded second position, the method comprising:
   determining whether the display device is in the folded second position; and
   if the display device is in the folded second position, connecting the second receiver on the first surface of the display device to an audio path and setting the amplification factor of the microphone to a predetermined level wherein a phone call is conducted while the display device is in the folded second position.

9. The method of claim 8, further comprising:
if the display device is not in the folded second position, connecting the first receiver to the audio path and setting the amplification factor of the microphone to a second predetermined level.

10. The method of claim 9, further comprising:
providing the first and second receivers mounted on the first surface at different positions.

11. The method of claim 9, wherein the first predetermined level is greater than the second predetermined level.

12. The terminal of claim 8, wherein, when the display device is in the folded second position, the display window of the display device is viewable by a user.

13. The terminal of claim 12, further comprising:
connecting the second receiver to the audio path and setting the amplification factor of the microphone in a high-gain state.

14. The method of claim 8, wherein determining whether the display device is in the folded second position includes:
detecting the magnetic field emanating from the magnet in the display device at a first location on the terminal body.

15. The method of claim 8, further comprising:
determining that the display device has been rotated from a closed to an opened position by detecting the absence of the magnetic field at the predetermined location on the terminal body emanating from the magnet in the display device.

16. The method of claim 8, wherein the display device is determined to be in the second folded position when the display device has been rotated about the axis extending substantially perpendicular to the upper surface of the terminal body and then folded over a keypad of the terminal body so that the display window is facing outwardly.

17. A mobile terminal, comprising:
a terminal body including a microphone;
a display device including a display window rotatably coupled to the terminal body;
a first receiver included in the display device to output audio signals when the display device is in an unfolded first position;
a second receiver included in the display device to output audio signals when the display device is in an folded second position;
a controller that controls the microphone, the first receiver, and the second receiver during a call when the display device is in the second position; and
a sensor device controlled by the controller that senses when the display device is in the second position, wherein the sensing device comprises:
a magnet that generates a magnetic field;
a first sensor that senses the magnetic field of the magnet when the display device is in a first position where the display window is folded over a keypad, and that applies a corresponding signal to the controller; and
a second sensor that senses the magnetic field of the magnet when the display device is in the second position.

18. The terminal of claim 17, wherein the magnet is mounted at one edge of the display device, and the first and second sensors are respectively mounted at an opposing edge of the terminal body.

\* \* \* \* \*